United States Patent
Hasegawa et al.

(10) Patent No.: US 6,566,778 B1
(45) Date of Patent: May 20, 2003

(54) CAGE-TYPE INDUCTION MOTOR FOR HIGH ROTATIONAL SPEEDS

(75) Inventors: Kazumitu Hasegawa, Narasino (JP); Shinichi Ozaki, Kunitachi (JP); Toshio Takahashi, Tokyo (JP); Noriyasu Sugitani, Chiba (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 0 days.

(21) Appl. No.: 09/648,808

(22) Filed: Aug. 28, 2000

(30) Foreign Application Priority Data

Jan. 24, 2000 (JP) .......................................... 2000-013604

(51) Int. Cl.$^7$ .......................... H02K 17/16; H02K 1/22
(52) U.S. Cl. ........................ 310/211; 310/216; 310/254
(58) Field of Search ................................ 310/216, 211, 310/254; 29/596–598

(56) References Cited

U.S. PATENT DOCUMENTS

| | | | | |
|---|---|---|---|---|
| 2,607,816 A | * | 8/1952 | Ryder | 310/216 |
| 2,695,969 A | * | 11/1954 | Yates | 310/216 |
| 2,711,008 A | * | 6/1955 | Smith | 310/216 |
| 4,392,073 A | * | 7/1983 | Rosenberry, Jr. | 310/216 |
| 5,422,527 A | * | 6/1995 | Lazzaro | 310/211 |
| 5,625,243 A | * | 4/1997 | Lindgren et al. | 310/211 |
| 5,642,010 A | * | 6/1997 | Carosa et al. | 310/211 |
| 5,869,915 A | * | 2/1999 | Blake | 310/211 |

FOREIGN PATENT DOCUMENTS

| | | | |
|---|---|---|---|
| JP | 2-73196 | * | 3/1990 |
| JP | 6-253511 A | | 9/1994 |
| JP | 10-127022 A | | 5/1998 |

* cited by examiner

*Primary Examiner*—Tran Nguyen
(74) *Attorney, Agent, or Firm*—Griffin & Szipl, P.C.

(57) ABSTRACT

A rotor 10 has a structure with a rotor core 12 and rotor conductors 14, the rotor core 12 is made of a weakly magnetic substance with a high permeability and a relatively low electrical conductivity, and the rotor conductors 14 are composed of a conducting material with a low permeability and a relatively high electrical conductivity. Also, the rotor core 12 and the rotor conductors 14 are formed into a single body that has an entire-surface with a smooth cylindrical shape. Furthermore, a stator 20 is composed of a plurality of stator sheets 22 laminated in the axial direction and a stator winding 24. Each stator sheet is formed with a closed circular inner ring portion 22a and an outer ring portion 22b, with slots 23 that penetrate the sheets between the ring portions, and the stator winding is housed in the slots.

4 Claims, 10 Drawing Sheets

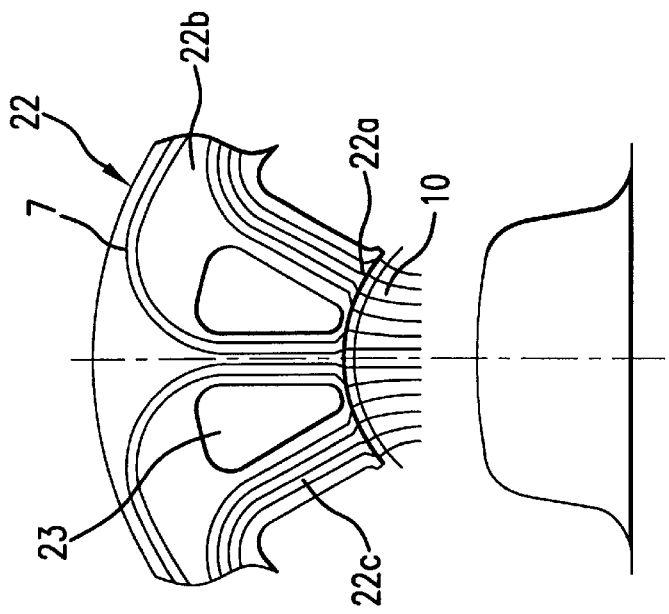
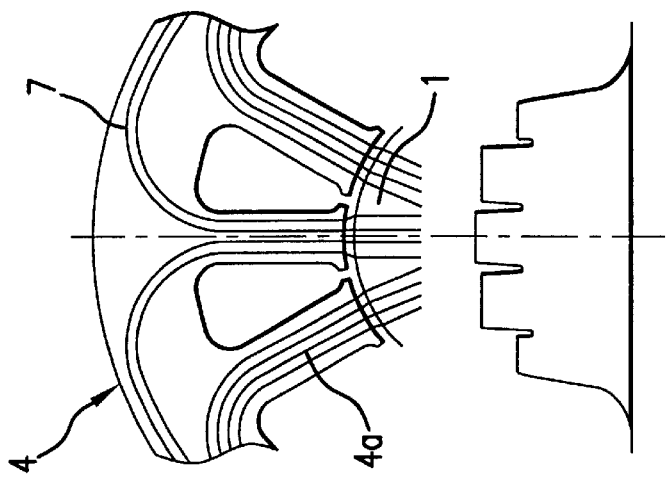
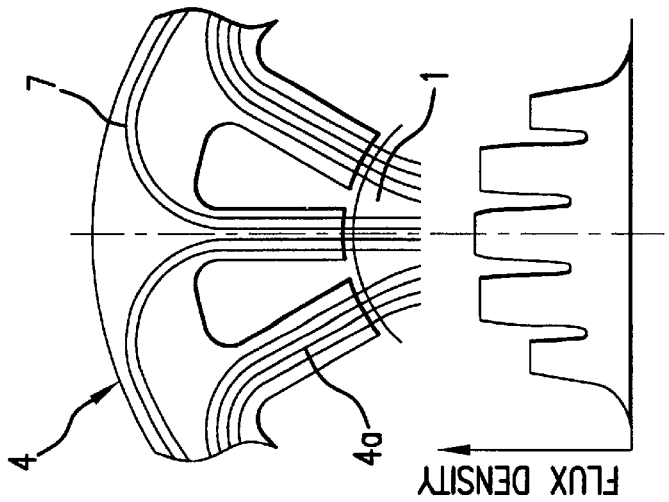

CONVENTIONAL STATOR
GAP LENGTH 2.5 mm
COATING THICKNESS 0.8 mm

HST PATENT

CONVENTIONAL STATOR
GAP LENGTH 1 mm
COATING THICKNESS 0.8 mm
MODEL WITH

SMALLER GAP
THAN HST PATENT

CLOSED SLOTS
GAP LENGTH 1 mm
COATING THICKNESS 0.8 mm

PRESENT INVENTION

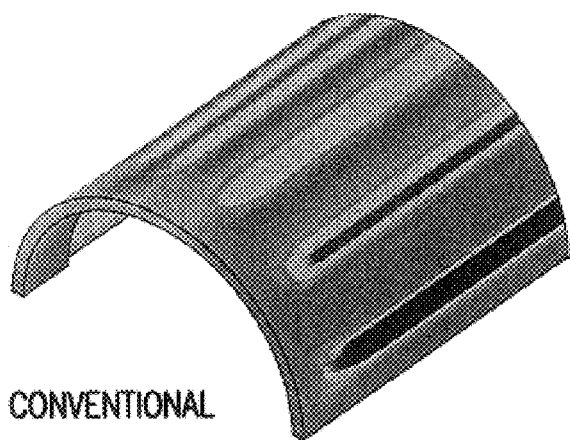
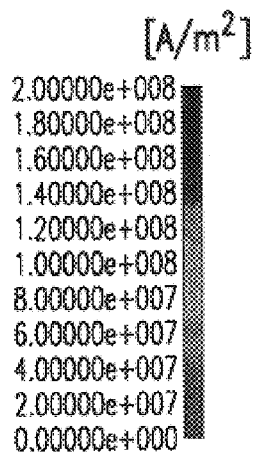
CONVENTIONAL
FIG. 6A
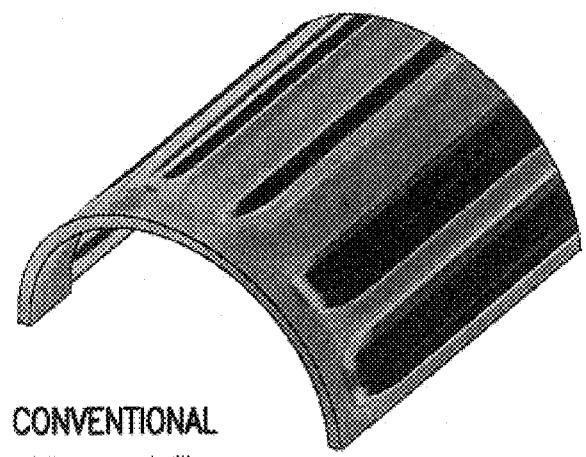
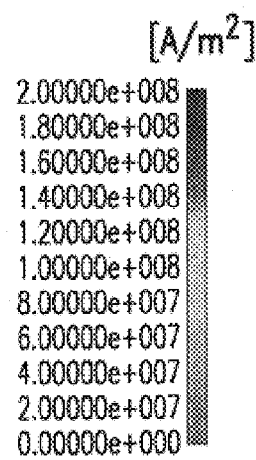
CONVENTIONAL
FIG. 6B
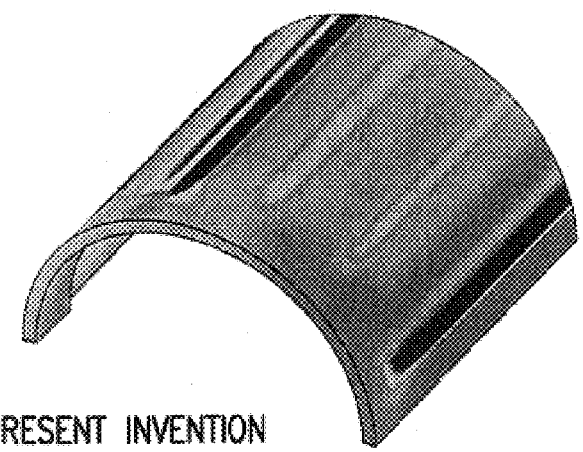
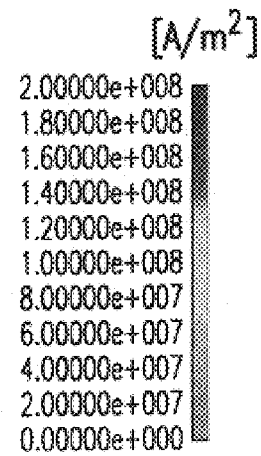
PRESENT INVENTION
FIG. 6C

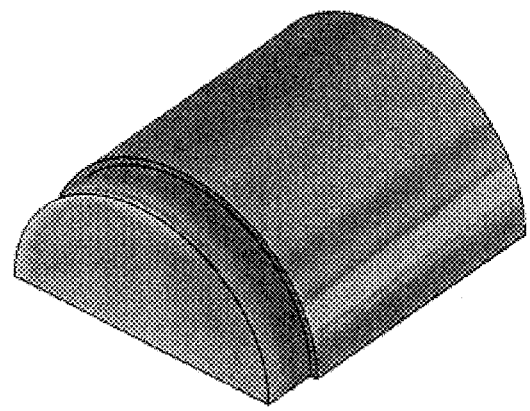
CONVENTIONAL
FIG. 7A
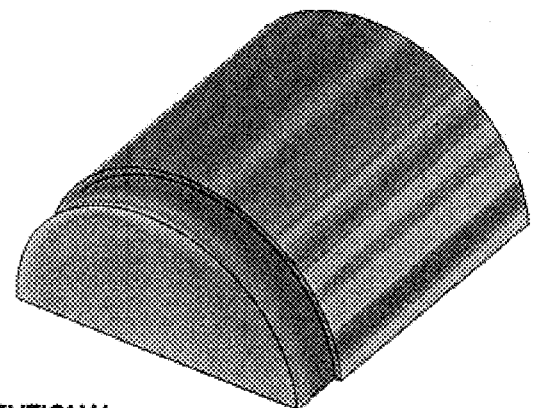
CONVENTIONAL
FIG. 7B
PRESENT INVENTION

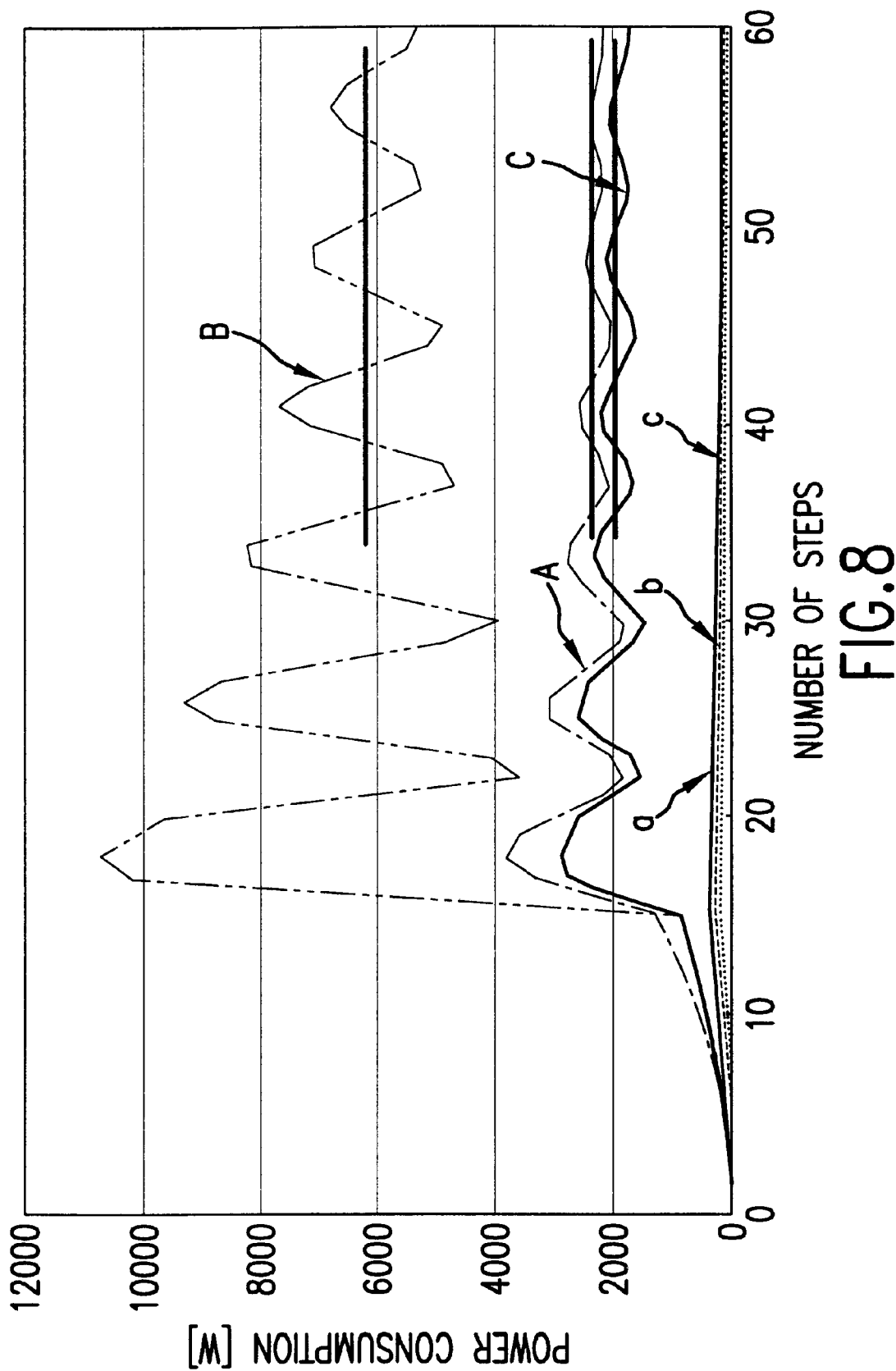

CAGE-TYPE INDUCTION MOTOR FOR HIGH ROTATIONAL SPEEDS

BACKGROUND OF THE INVENTION

1. Technical Field of the Invention

The present invention relates to a cage-type induction motor that is appropriate for and used for high rotational speeds.

2. Prior Art

When a rotatable disk made of copper is placed between the poles of a permanent magnet shaped like a cradle and the magnet is rotated in one direction, the disk revolves in the direction of movement of the magnet. This phenomenon is called Arago's rotating disk and provides the operating principle of an induction motor. As the magnet moves, a current is induced in the disk (Fleming's right-hand rule), and a rotational force is produced by the current and the magnetic flux of the magnet (Fleming's left-hand rule), and the disk rotates in the same direction as the movement of the magnet.

In a polyphase induction motor, the movement of the permanent magnet in Arago's rotating disk is replaced by a rotating magnetic field produced by the polyphase alternating current, and the motor is composed of a stator that produces the rotating magnetic field and a rotor that rotates. Unlike Arago's rotating disk, the direction of magnetic flux in a motor is arranged so that the direction of the magnetic flux is perpendicular to the rotor surface, and the direction of the currents induced in the rotor is parallel to the shaft. Therefore, the stator and the rotor are coaxial cylinders.

The stator generates a rotating magnetic field using AC electric power from a polyphase power supply, induces a current in the secondary winding of the rotor by induction through the gap, a rotational force is produced by the current and the magnetic flux of the rotating magnetic field (Fleming's left-hand rule), and the rotor rotates in the same direction as that of the rotating magnetic field.

The stator is normally composed of an iron core and a stator winding, both housed in the stator frame. The iron core of the stator is made of thin steel sheets laminated in the axial direction to reduce iron losses. The stator winding is placed in slots in the iron core, connected to a polyphase power supply and produces a rotating magnetic field.

The rotor is normally composed of a laminated iron core (rotor core) and a rotor winding. The rotor winding is installed in the slots of the iron core. The rotors are classified as either cage type or winding type. In a cage-type rotor, a copper bar is installed, in each slot of the rotor, and both ends of the copper bars are connected together by end rings.

When a cage-type induction motor rotates at a high speed (for instance, 100,000 rpm or more) and, for example, directly drives and rotates a turbo compressor, to enhance the reliability of the equipment and make it compact and reduce the power consumption various conditions are necessary including (1) a rigid structure capable of withstanding a high peripheral speed, (2) high efficiency and (3) high power factor.

In the conventional cage-type induction motor shown in FIG. 1A, laminated steel sheets are normally used in the rotor core 1, the conductors 2 are connected into a cage, the teeth 4a of the stator 3 are made partly open, and the air gap is small (0.5~1% of the diameter of the rotor).

However, this structure of a cage-type induction motor known in the prior art has problems as it severely limits the peripheral speed and causes local stress concentrations. More specifically, since the stresses are concentrated in the center part of the rotor-core 1, composed of laminated steel sheets, due to the centrifugal forces caused by the high rotational speed, the peripheral speed must be limited to, for example, about 200~230 m/s to prevent the rotor core from being fractured. Therefore, this type of induction motor is not suitable for higher rotational speeds. In addition, because part of the conductor 2 protrudes through the rotor surface, there is the problem of stress concentrations in the thin-wall portions of the cage of the rotor core.

To solve this problem, the patents "Cage-type rotor of high-speed induction motor" (unexamined Japanese patent publication No. 253511, 1994), "Solid rotor for cage-type induction motor and its manufacturing method" (unexamined Japanese patent publication No. 127022, 1998), etc. proposed a rotor with a structure such as that shown in FIG. 1B, the laminated steel sheets are replaced by a solid rotor (integrated) to increase the strength, and the cage bars are embedded for protection.

However, the aforementioned solid, embedded cage rotor suffers from the problems that (1) the electrical conductivity at the rotor surface is high, and eddy currents are produced on the rotor surface, (2) the eddy currents on the surface do not contribute to rotating torque, but reduce the efficiency due to eddy current losses, (2) the effects of the eddy currents are concentrated at the end portions of the stator teeth, where the magnetic flux is not distributed uniformly, and so on.

Also the patent, "Asynchronous electric machine and rotor and stator for use in association therewith" (U.S. Pat. No. 5,473,211) proposes the structure shown in FIG. 1C wherein the conductors are disposed continuously on the surface of the rotor, and the air gap is large. More explicitly, this patented invention provides an integrated structure of the rotor by coating the entire surface of the rotor with a high electrical conductivity material so that rotational speeds as high as a maximum of 1 million rpm are possible and by making the gap δ between the rotor and the stator greater than the conventional value (0.5~1% of the diameter of a rotor), the harmonic components in the distribution of magnetic flux are reduced by the large gap, resulting in a reduction of the eddy current losses.

However, the above-mentioned continuously coated surface rotor structure cannot avoid problems such as (1) because the gap 6, δ, is large and the surface of the rotor is covered with a coating of high electrical conductivity material, the distance from the inner surface of the stator to the magnetic material of the rotor core (thickness of the surface coating+air gap) is increased, causing an increase in the inactive magnetic flux, so that the power factor is reduced, and (2) since the electrical conductivity on the surface of the conductor is uniform, eddy currents are produced in the surface coating.

SUMMARY OF THE INVENTION

The present invention is aimed at solving these problems. That is, the objective of the present invention is to provide a cage-type induction motor for high rotational speeds with the advantages that (1) high rotational speeds are enabled by integrating the structure of the rotor and eliminating local stress concentrations, (2) the efficiency is increased by reducing the formation of eddy currents on the rotor surface, and (3) the power factor can be improved by shortening the distance between the inner surface of the stator and the magnetic material of the rotor core, thereby reducing the inactive magnetic flux in the gap.

According to the present invention, in an induction motor using a stator that produces a rotating magnetic field and a rotor that rotates, the aforementioned rotor (10) is composed of a rotor core (12) and rotor conductors (14), the rotor core is made of a weakly magnetic material with a high permeability and a relatively low electrical conductivity, the rotor conductors are composed of a highly conducting substance with a low permeability and a relatively high electrical conductivity, the aforementioned rotor core (12) and rotor conductors (14) are integrated together into a smooth uniform cylindrical surface, the above-mentioned stator (20) is formed from a plurality of stator sheets (22) laminated in the axial direction and a stator winding (24), the shape of each stator sheet is such that there is a circular, closed inner ring portion (22a) and an outer ring portion (22b), there are slots (23) penetrating the sheets, and the stator winding is contained in the aforementioned slots.

In the aforementioned configuration according to the present invention, the rotor core (12) and the rotor conductors (14) are integrated into one body and the outer surface is a smooth cylindrical surface, therefore, there are no stress concentrations and the centrifugal stresses can be transmitted smoothly to the rotor core which has a high tensile strength, and the rotor can withstand a high peripheral speed.

The inner ring portion (22a) of the axially laminated stator sheets (22) and the outer ring portion (22b) individually form two smooth surfaces without gaps, and the longitudinal slots (23) in which the fixed winding is installed are between the two surfaces, therefore the slots do not open onto the surfaces, and the density of the magnetic flux passing from the inner ring portion (22a) into the circumferential gap is evenly distributed, so there is a reduction in the eddy currents generated in the rotor surface.

According to a preferred embodiment of the present invention, a plurality of teeth portions (22c) extend radially between the aforementioned slots (23) and connect the above-mentioned inner ring portion (22a) and outer ring portion (22b), and the stator winding is installed in the slots only at the teeth portions, and either the inner ring portion (22a) or the outer ring portion (22b) is joined to the other portion after the winding has been installed.

According to this configuration, the stator winding is installed in the slots only at the teeth portions while either the inner ring portion (22a) or the outer ring portion (22b) is removed, and the outer ring portion (22b) or the inner ring portion (22a) is placed in position after completing the installation of the winding, thus a stator without open slots can easily be manufactured.

Other objectives and advantages of the present invention are revealed in the following paragraphs referring to the attached drawings.

BRIEF DESCRIPTION OF THE DRAWINGS

FIG. 4A shows the distribution of the density of magnetic flux on the surface of the stator 22 according to the present invention. FIGS. 4B and 4C show the distribution of magnetic flux density for a conventional stator 4.

FIGS. 6A, 6B and 6C show the analysis results for the current density in the surface portions of the conductors.

FIGS. 7A, 7B and 7C show the analysis results for the current density in the rotor core.

FIG. 8 shows the analysis results for the power consumed in the rotor.

DESCRIPTION OF PREFERRED EMBODIMENTS

Figure 1A:
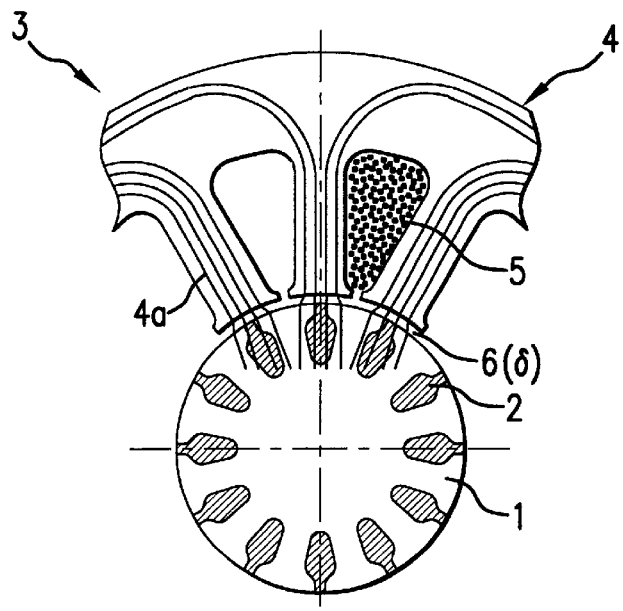
FIGS. 1A, 1B and 1C schematically show the stator and the rotor of a conventional cage-type induction motor.

The output P of a cage-type induction motor is given by $P = mEI\eta\cos\alpha$. Where m is the number of phases, E the phase voltage, I the phase current, $\eta$ the efficiency and $\cos\alpha$ the power factor.

When a cage-type induction motor rotates at a high speed (for instance, 100,000 rpm or more) to drive, for example, a turbo compressor directly, if the efficiency is low, a large input (current) is required, and the driving device (the cage-type induction motor for high rotational speeds) becomes large in size, and moreover, the part of the energy that is not converted to mechanical output is dissipated in the motor as heat, therefore various problems arise. If the power factor is low, the current is higher due to the reactive power caused by the phase angle between the voltage and current, and as a result, a driving device with a larger output is needed. Consequently, when a turbo compressor etc., for instance, is directly driven and rotated by a cage-type induction motor at a high speed (for example, 100,000 rpm or more), a high efficiency and high power factor are indispensable to make the equipment smaller and reduce the amount of power consumed.

The phase voltage E of a cage-type induction motor is proportional to the flux $\phi$ and the frequency f. The flux $\phi$ is also proportional to the inner diameter of stator, Di, and the effective length of the stator, Ls. Therefore, to produce a large output P to directly drive and rotate a large turbo compressor etc., the phase voltage E, that is the flux $\phi$ should be made greater, and for this purpose, the product of the inner diameter of the stator, Di, and the effective length of the stator, Ls, must be made large. However, if the effective length Ls of the stator is too large, the critical speed becomes low, so that the motor cannot rotate at a high speed. In other words, for stable operation, the effective length Ls of the stator should be reduced to increase the rigidity of the rotor, and the critical speed must be made higher than the required rotational speed. As a result, the inner diameter Di of the stator becomes larger in proportion thereto, and the peripheral speed is also correspondingly high, so that the structure must withstand these conditions during operation.

Preferred embodiments of the present invention are described below referring to the drawings.

Figure 2:
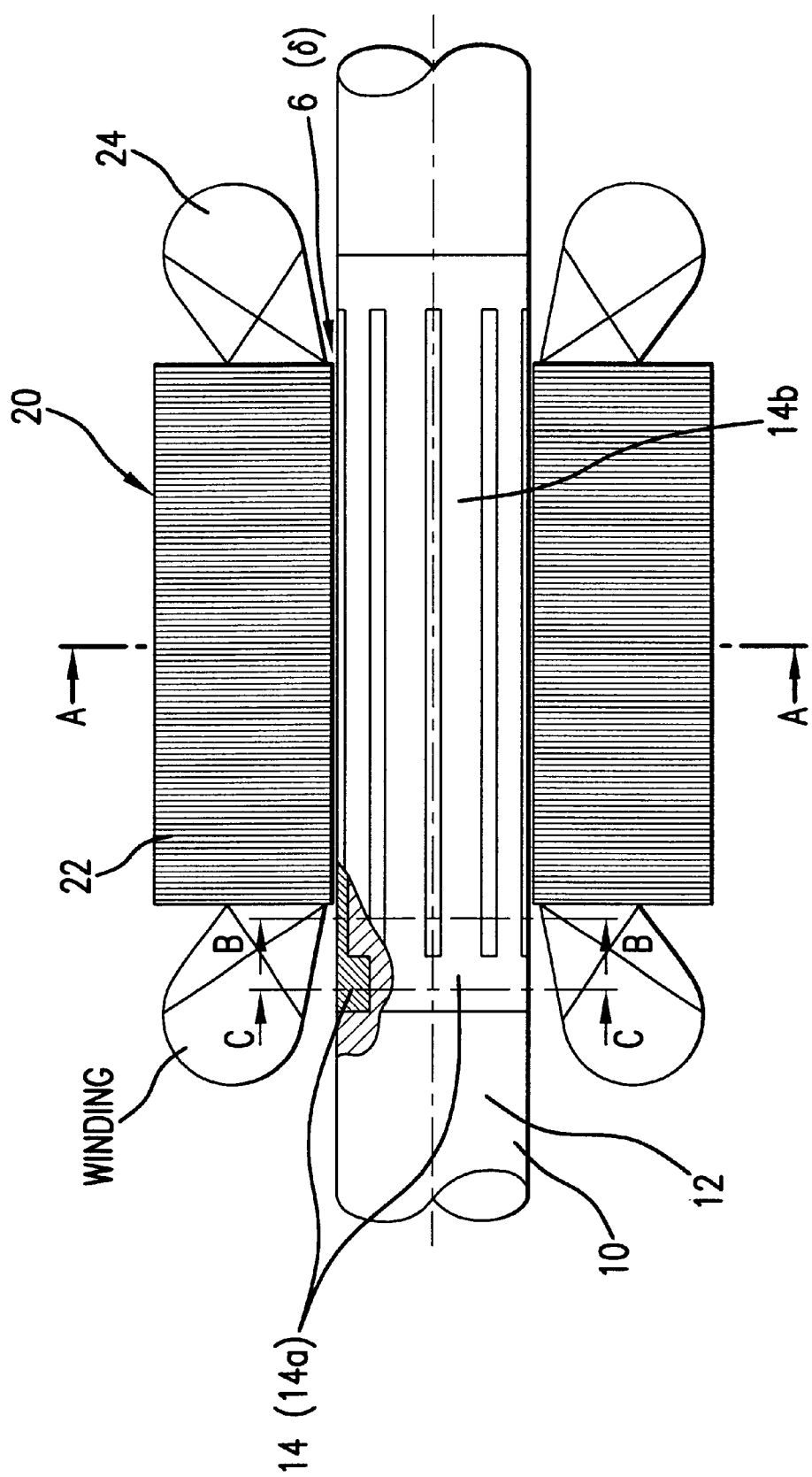
FIG. 2 shows a cross section of a cage-type induction motor for high rotational speeds according to the present invention.
Figure 3A:
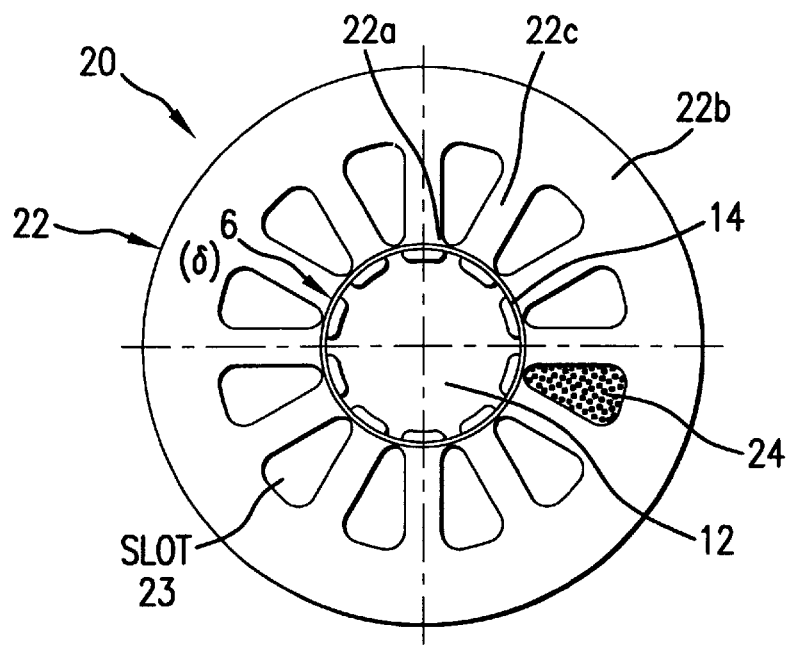
FIGS. 3A, 3B and 3C are sections through A—A, B—B and C—C in FIG. 2.
Figure 3B:
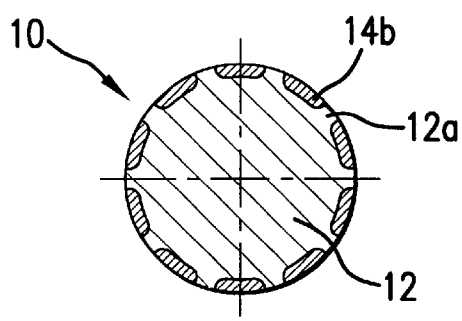
Figure 3C:
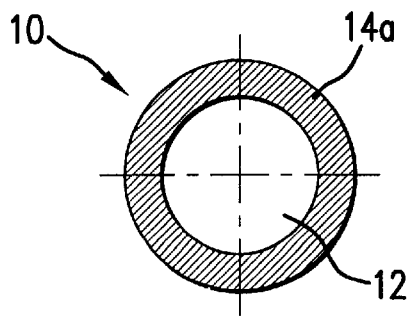

FIG. 2 shows a general sectional view of a cage-type induction motor for a high rotational speed according to the present invention, and FIGS. 3A, 3B and 3C are sectional views along A—A, B—B and C—C, respectively, in FIG. 2.

In FIGS. 2, 3A, 3B and 3C, the high-speed cage-type induction motor according to the present invention is provided with a stator 20 for generating a rotating magnetic field and a rotor 10 that rotates. The stator 20 and the rotor 10 are disposed coaxially, and the rotor 10 is supported at both ends thereof by bearings, not illustrated, coaxial with the center line. The stator 20 produces a magnetic field which rotates around the center line using AC power taken from a polyphase power supply, induces induction currents in the secondary windings (bar-like conductors 14b to be described later) of the rotor 10 by induction through the air gap; a rotating force (Fleming's left-hand rule) is produced by the induced currents and the magnetic flux of the rotating magnetic field, and the rotor 10 rotates in the same direction as the rotating magnetic field.

As shown in FIG. 2, the stator 20 is composed of a plurality of stator sheets 22 and a stator winding 24 housed in a stator frame (not illustrated). The stator sheets 22 are made from electromagnetic steel sheets laminated in the axial direction to reduce iron losses. There are no inner openings in the stator sheets 22, and the wall thickness of the slot portions decreases towards the center line.

In detail as shown in FIG. 3A, each stator sheet 22 is composed of an inner ring portion 22a, an outer ring portion 22b and a plurality (12 in this example) of teeth portions 22c. The inner ring portion 22a and outer ring portion 22b are circular in shape with the inner and outer peripheries closed, respectively, and between the inner and outer peripheries, a plurality (12 in this example) of slots 23 are constructed.

Each tooth portion 22c extends radially between adjacent slots 23, and the inner end thereof is joined to the inner ring portion 22a, and the outer end is connected to the outer ring portion 22b, thereby magnetically connecting both portions.

The stator winding 24 is installed in the slots 23. More explicitly, for instance, either the inner ring portion 22a or the outer ring portion 22b is fabricated separately in advance, the fixed winding 24 passes through the slots 23 only at the teeth portions 22c, and after completing the installation of the winding, the outer ring portion 22b or the inner ring portion 22a is joined by welding etc. to the other portion.

The stator winding 24 is composed of copper wire (magnet wire) or litz wire. This stator winding 24 is connected to an external polyphase power supply and produces a rotating magnetic field, in the same way as in a conventional cage-type induction motor known in the prior art.

The gap ($\delta$) 6 between the stator 20 and the rotor 10 is limited only to the minimum needed to allow a flow of cooling air to the rotor surface, with a maximum value similar to or less than conventional values (0.5~1% of the diameter of the rotor).

Using this configuration, the air gap ($\delta$) 6 can be minimized, so that the magnetic reluctance of the air gap is decreased together with a reduction in the magnetomotive force, therefore, the reactive current is reduced and the power factor can be expected to increase.

In FIGS. 2, 3B and 3C, the rotor 10 of the high rotational speed cage-type induction motor according to the present invention is composed of a rotor core 12 and rotor conductors 14. The rotor core 12 is made of a weakly magnetic material with a high permeability and relatively low electrical conductivity, for example, high tensile chrome-molybdenum steel. The rotor conductors 14 are made from a conducting material with a low permeability and a rather high electrical conductivity, for instance, copper, aluminum or their alloys.

The rotor core 12 and the rotor conductors 14 are joined together firmly by a HIP (hot isostatic pressing) machine, for instance, and integrated into a single unit whose entire surface has a smooth cylindrical shape.

According to the example shown in FIGS. 3B and 3C, the rotor conductors 14 are configured with a pair of end rings 14a cylindrical in shape that enclose the rotor core in the form of a ring.outside the stator, and a plurality of bar-like conductors 14b that are connected to the end rings 14a, each of which is insulated in the peripheral direction. The end rings 14a are connected to the ends of a plurality of bar-like conductors 14b. The depth of the end rings 14a is predetermined so that they extend further in the axial direction than the bar shaped conductors 14b. These end rings 14a function in the same way as the short-circuit rings of a conventional cage-type rotor.

Figure 1B:
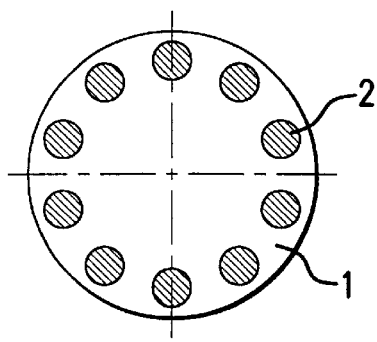
Figure 1C:
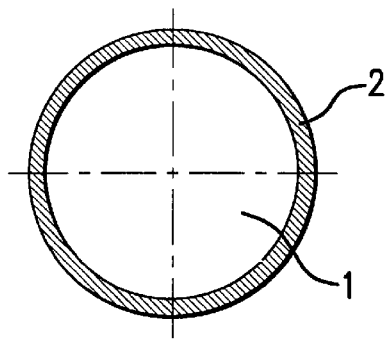

However, the present invention is not restricted only to the aforementioned configuration, but the configuration shown in FIG. 1B or 1C can also be used.

According to the above-mentioned configuration of the present invention, because the rotor core 12 and the rotor conductors 14 are integrated together, and the entire surface is a smooth cylinder, there are no local stress concentrations, and the stresses caused by centrifugal forces can be smoothly transmitted to the high-tensile-strength rotor core, therefore, the assembly can withstand a high peripheral speed.

That is, because the rotor core 12 and rotor conductors 14 are joined together strongly by pressing in an HIP machine etc., the stresses due to centrifugal forces are concentrated into the center portion of the rotor core, therefore, the assembly of the rotor core and conductors can operate at a high peripheral speed. By providing the rotor with salient poles, the efficiency and power factor can be improved.

FIG. 4A shows the distribution of magnetic flux density for the stator 22 according to the present invention. FIGS. 4B and 4C show the distributions of magnetic flux for conventional stators 4. In each of the figures only the upper part of each stator is shown but in each case the stator is a continuous structure surrounding the rotor 10 or 1 without any gap.

In the above-mentioned stator 22 (stator sheets) according to the present invention, there are no openings on the inner surface of the stator, and the wall thickness becomes thinner towards the center line of the slots. In the following paragraphs, slots with this type of construction are called closed slots. On the contrary, FIGS. 4B and 4C show semi-open slots and full-open slots, respectively, and the slots have openings in the inner surface of the stator.

In FIGS. 4A through 4C, the lower diagrams show typical distributions of magnetic flux on the rotor surface. For the stators with openings (FIGS. 4B and 4C), (1) the magnetic flux 7 leaving from the tooth portion 4A of the stator is distributed unevenly and.densely in the air gap, (2) when the air gap is made smaller, the unevenness of the flux distribution on the rotor surface increases resulting in more eddy currents, and (3) when the air gap is made larger, although the unevenness in the flux distribution on the rotor surface is decreased and the eddy currents also become smaller, the power factor is reduced. Therefore, it is understood that for a stator with open slots (FIGS. 4B or 4C), it is unavoidable that eddy currents will increase or the power factor will decrease because of the uneven distribution of magnetic flux.

Conversely, in the stator according to the present invention without open slots (FIG. 4A), the magnetic flux 7 leaving the teeth portions 22c of the stator 22 are evenly distributed in the air gap due to the presence of the inner ring portion 22a. Consequently, even if the air gap is made smaller, the flux density on the rotor surface is still uniform, so eddy current losses are decreased while the power factor is also high.

That is, according to the present invention, the gap ($\delta$) 6 can be reduced to the minimum needed to allow a flow of air to cool the rotor surface, and, as a maximum the gap can be made equivalent to or smaller than gaps on conventional motors (0.5~1% of the diameter of rotor), however even with a narrow air gap, there are no open parts on the internal surface of the stator, so that the distribution of magnetic flux is even and eddy currents produced on the rotor surface are decreased, therefore, an increase in the efficiency can be expected.

As described above, the cage-type induction motor for high rotational speeds according to the present invention provides preferred embodiments such as (1) the rotor has an integral construction without local stress concentrations, thereby enabling high rotational speeds, (2) eddy currents produced on the rotor surface can be reduced so increasing the efficiency, and (3) the distance between the inner surface of the stator and the magnetic material of the rotor core is reduced, and inactive magnetic flux in the air gap can be reduced so increasing the power factor.

Preferred embodiments of the present invention are explained below in detail referring to the drawings.

Figure 5A:
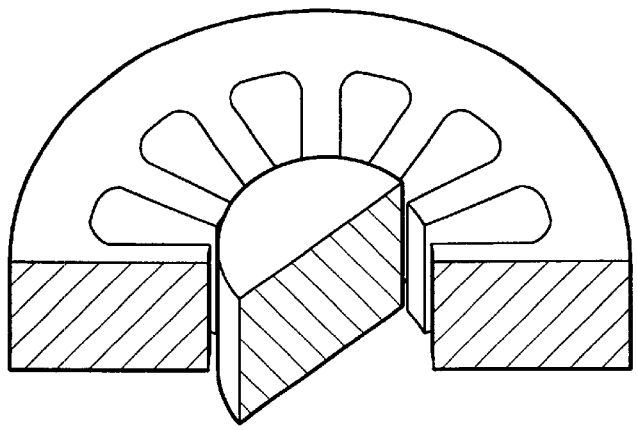
FIGS. 5A and 5B show the conventional models used for the present analysis.
Figure 5B:
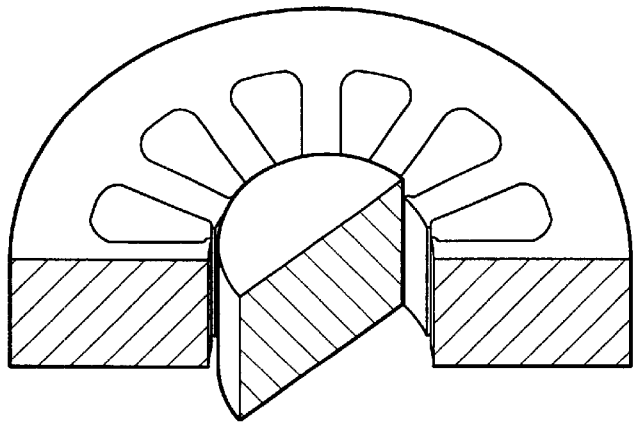
Figure 5C:
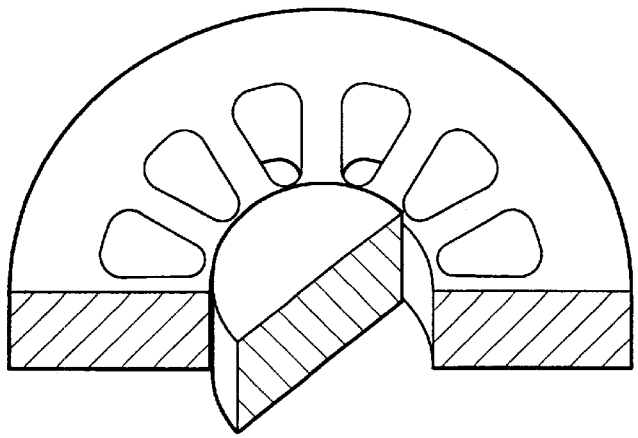
FIG. 5C shows the model used for the analysis of the present invention.

FIGS. 5A and 5B show conventional models used for the analysis, and FIG. 5C is the model according to the present invention that was analyzed. FIG. 5A corresponds to the example shown in FIG. 1C as disclosed in the U.S. Pat. No. 5,473,211 (called the HST patent for short), FIG. 5B corresponds to a model with a gap smaller than that in the HST patent, and FIG. 5C shows the model according to the present invention with the same gap as that in FIG. 5B.

FIGS. 6A, 6B and 6C show the analysis results for the current densities in the conductor portions of the coating and correspond to FIGS. 5A, 5B and 5C, respectively. As seen in FIG. 6B, the model (FIG. 5B) with a gap smaller than that of the HST patent produces a current distribution with very high local intensities, therefore, the eddy current losses are obviously increased. Nevertheless, the model according to the present invention (FIG. 5C) offers a substantially similar current density distribution to that in FIG. 6A, despite having the same gap as that in FIG. 5B.

Figure 7C:
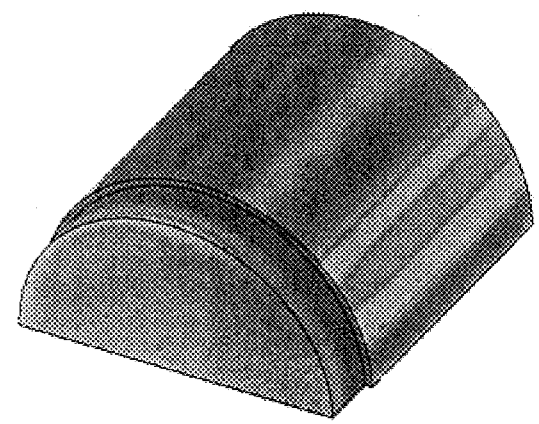

FIGS. 7A, 7B and 7C give the analysis results for current densities in the rotor core portions, corresponding to the models in FIGS. 5A, 5B and 5C, respectively. From these figures, one skilled in the art may understand that the distributions of current densities in the rotor core portions in FIGS. 7A, 7B and 7C are essentially identical, and that differences in current density distributions in the rotor core portions are small.

FIG. 8 shows the analysis results for power consumption in the rotor portions. Models used for this analysis had an output of 75 KW at 104,000 rpm with a slip of 0.01. The number of steps is plotted on the abscissa, and power consumption is the ordinate. A, B and C in FIG. 8 show power consumed in the coated conductor portions and correspond to the models shown in FIG. 5A, 5B and 5C, and a, b and c show the power consumed in the rotor core portions and correspond to the models shown in FIGS. 5A, 5B and 5C.

FIG. 8 obviously shows that a very small amount of power is consumed in each of the rotor core portions. However, it can also be seen that the model (FIG. 5B) with a gap smaller than that in the HST patent has a larger power consumption. On the contrary, the models shown in FIGS. 5A and 5C consume similar amount of power A and C, that is, they have a small power consumption. In particular of these examples, the present invention offers the smallest power consumption.

Figure 9:
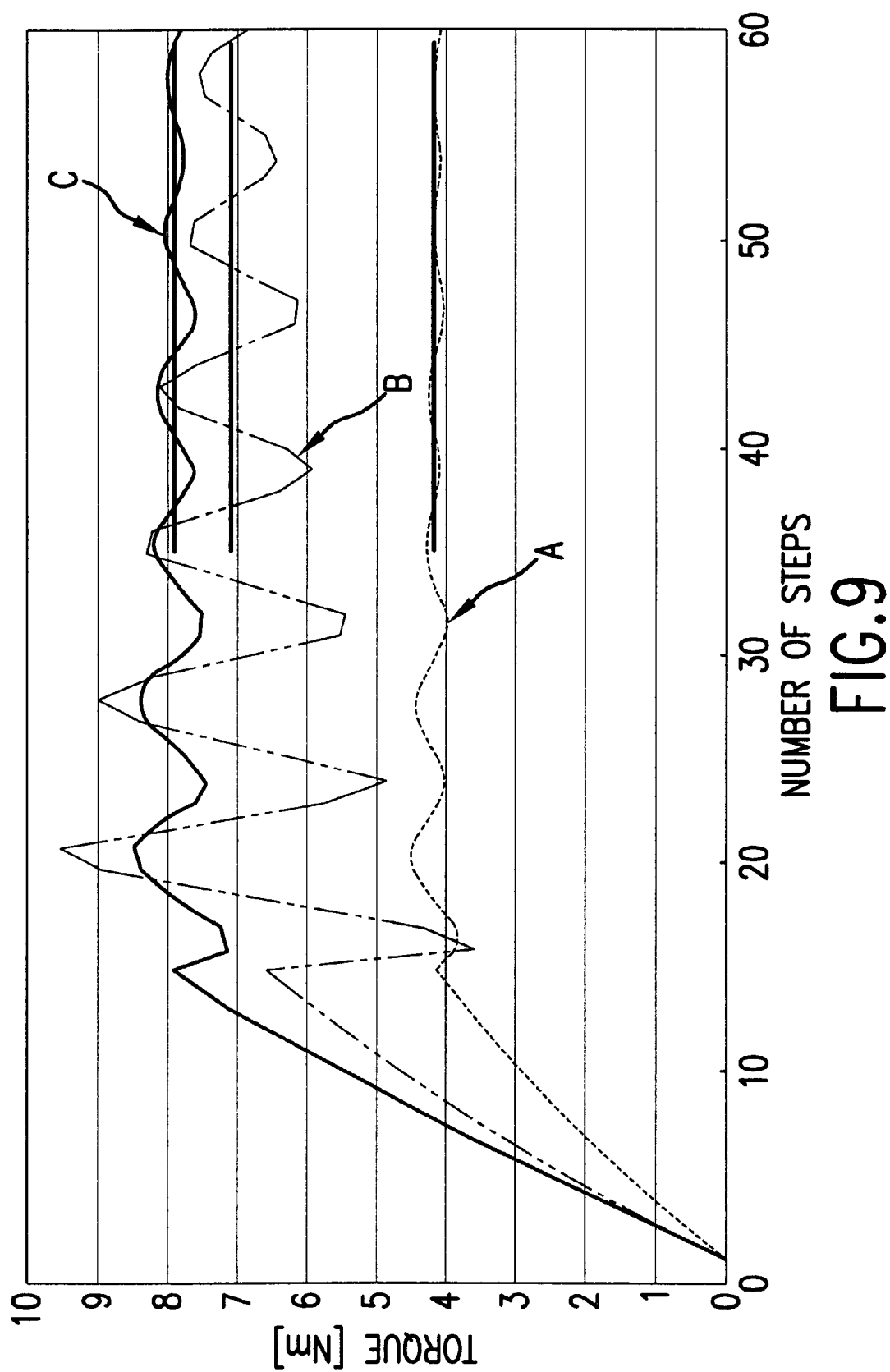
FIG. 9 presents the analysis results for output torque.

FIG. 9 shows the analysis results for output torque. This analysis was also performed for an output of 75 KW, 104,000 rpm models with a slip of 0.01. The abscissa and ordinate in FIG. 9 indicate the number of steps and output torque, respectively. A, B and C in FIG. 9 correspond to the models in FIGS. 5A, 5B and 5C, respectively.

FIG. 9 shows that the output torque A corresponding to the model in FIG. 5A is the smallest output torque because of the larger gap, and the output torque B for the model in FIG. 5B is larger than the output torque A. In contrast, the output torque C for the model according to the present invention is the largest.

Figure 10:
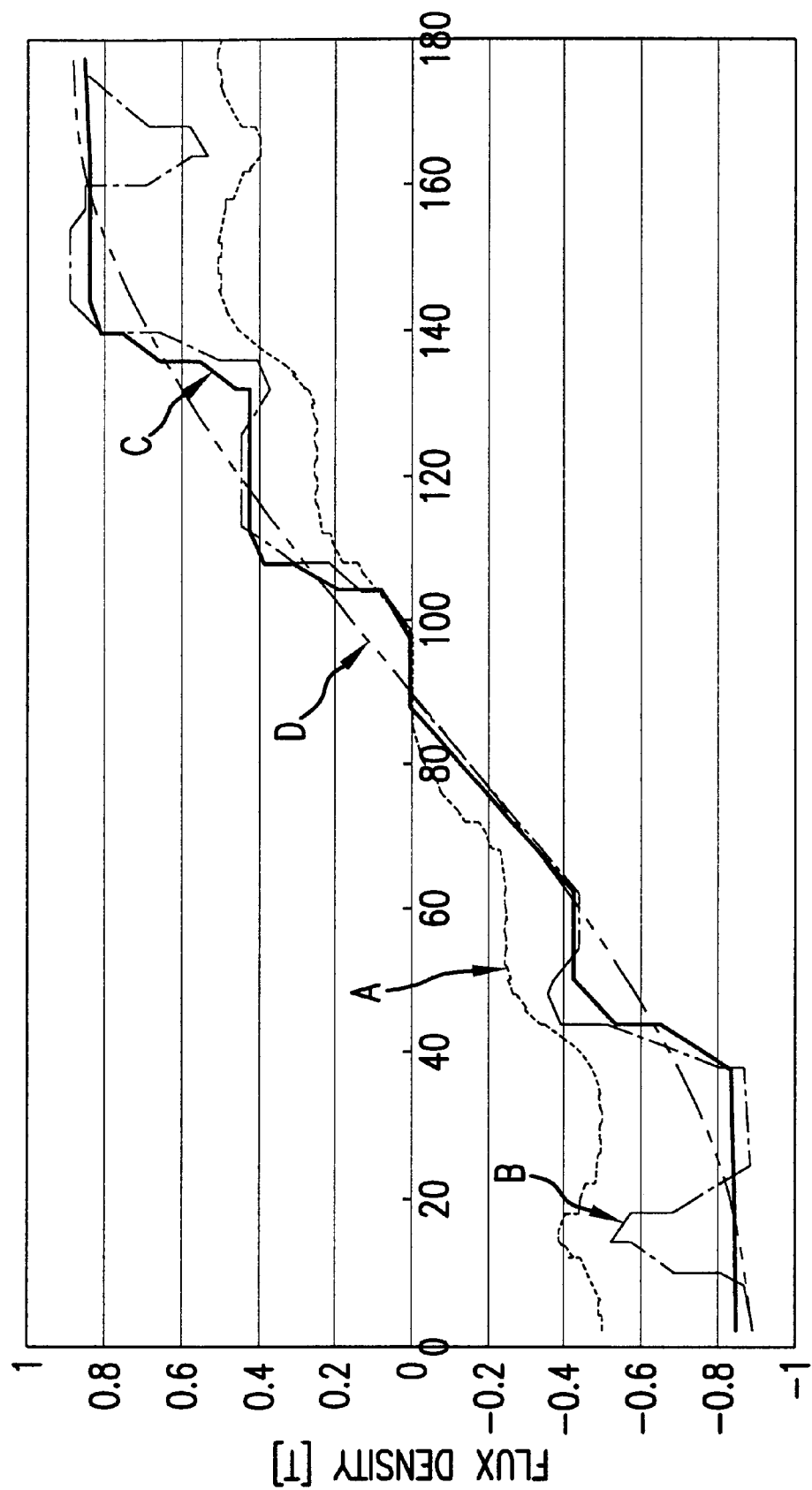
FIG. 10 gives the analysis results for the distribution of magnetic flux on the surfaces of the rotors.

FIG. 10 shows the analysis results for the distribution of magnetic flux density on the surface of the rotor. This analysis was performed on the first step of the 75 KW, 104,000 rpm model. Angles and flux densities are plotted on the abscissa and ordinate, respectively. A, B and C in FIG. 10 correspond to the models shown in FIGS. 5A, 5B and 5C, and D is a sine curve.

Clearly, it can be understood from FIG. 10 that the flux density distribution A corresponding to the model in FIG. 5A deviates significantly from the sine curve D because of the large gap. The flux density distribution B for the model in FIG. 5A is similar to the sine curve D, but with a large fluctuation. However, the magnetic flux density distribution C for the model according to the present invention is closest to the sine curve D, and provides a smooth distribution of magnetic flux in spite of the small gap.

Although the present invention has been described referring to several preferred embodiments, the scope of rights contained in the present invention should not be understood to be limited only to these embodiments. Conversely, the scope of rights of the present invention should include all improvements, corrections and equivalent entities covered by the scope of the attached claims.

What is claimed is:

1. A cage induction motor for high rotational speeds comprising:
    a stator for generating a rotating magnetic field; and
    a rotor disposed to rotate relative to the stator, wherein the rotor comprises a rotor core and rotor conductors, the rotor core is made from a weakly magnetic substance with a high permeability and a relatively low electrical conductivity, the rotor conductors are made of a conducting material with a low permeability and a relatively high electrical conductivity, and the rotor core and rotor conductors are integrated into one body having surfaces that form a smooth uniform cylindrical shape, and the stator comprises a plurality of axially laminated stator sheets and a stator winding, each stator sheet comprises a closed circular inner ring portion and an outer ring portion and slots that penetrate the sheet between the inner and outer ring portions, and the stator winding is housed through the slots.

2. The cage induction motor for high rotational speeds specified in claim 1, wherein a plurality of teeth portions extend radially between the slots and connect the inner ring portion to the outer ring portion, the stator winding is installed only in the teeth portion of the slots, and either the inner ring portion or the outer ring portion is joined after the stator winding has been installed.

3. The cage induction motor for high rotational speeds specified in claim 1, wherein the weakly magnetic substance of the rotor core is chrome-molybdenum steel.

4. A cage induction motor for high rotational speeds comprising:
    a stator for generating a rotating magnetic field; and
    a rotor disposed to rotate relative to the stator, wherein the rotor comprises a rotor core and rotor conductors, the rotor core is made from a weakly magnetic substance with a high permeability and a relatively low electrical conductivity, the rotor conductors are made of a conducting material with a low permeability and a relatively high electrical conductivity, and the rotor core and rotor conductors are integrated into one body having a surface that forms a smooth uniform cylindrical shape, and the stator comprises a plurality of axially laminated stator sheets and a stator winding, each stator sheet comprises a closed circular inner ring portion and an outer ring portion and slots that penetrate the sheet between the inner and outer ring portions, and the stator winding is housed through the slots, wherein eddy currents produced on the rotor surface are decreased by an even distribution of magnetic flux in a gap between the rotor and the stator.

* * * * *